M. A. DEES.
APPARATUS FOR FORMING PNEUMATIC TIRES.
APPLICATION FILED NOV. 24, 1913.
1,117,803.
Patented Nov. 17, 1914.
2 SHEETS—SHEET 2.
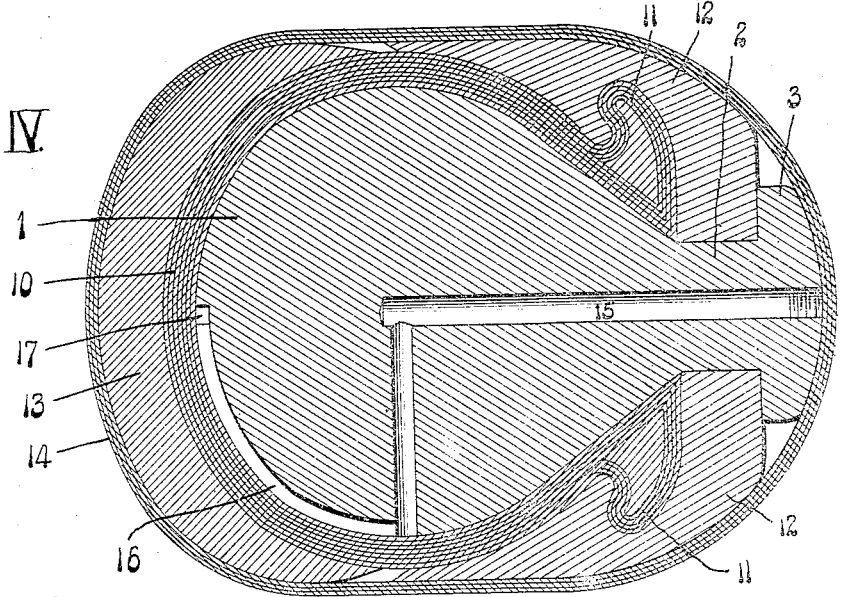
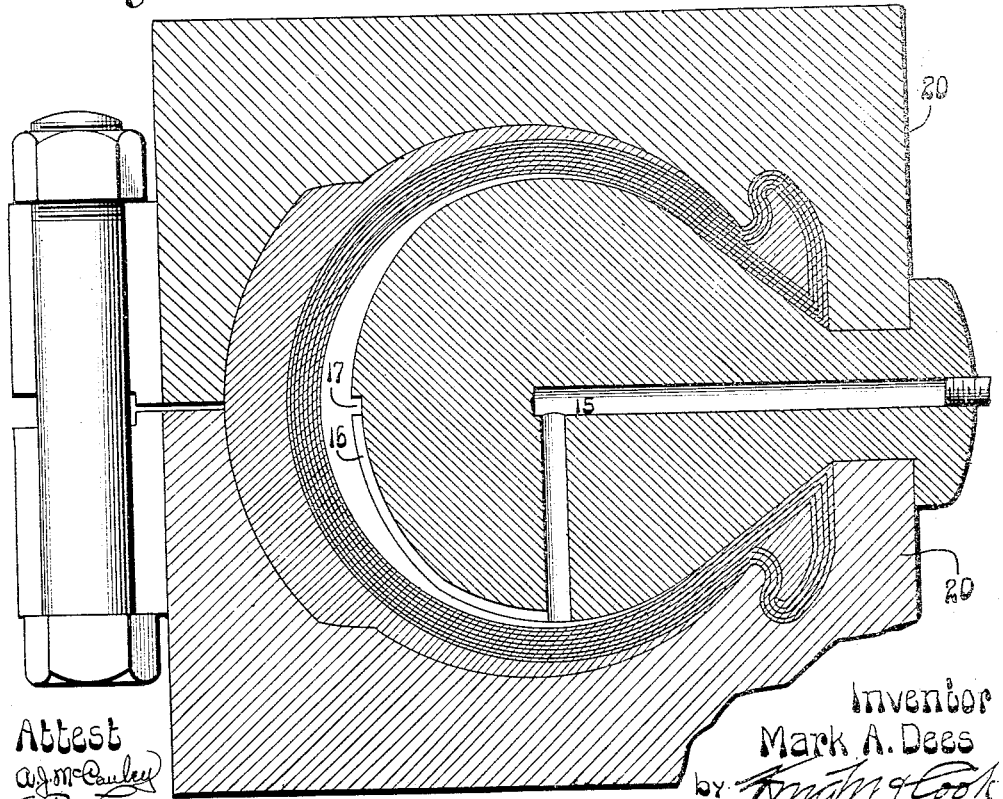

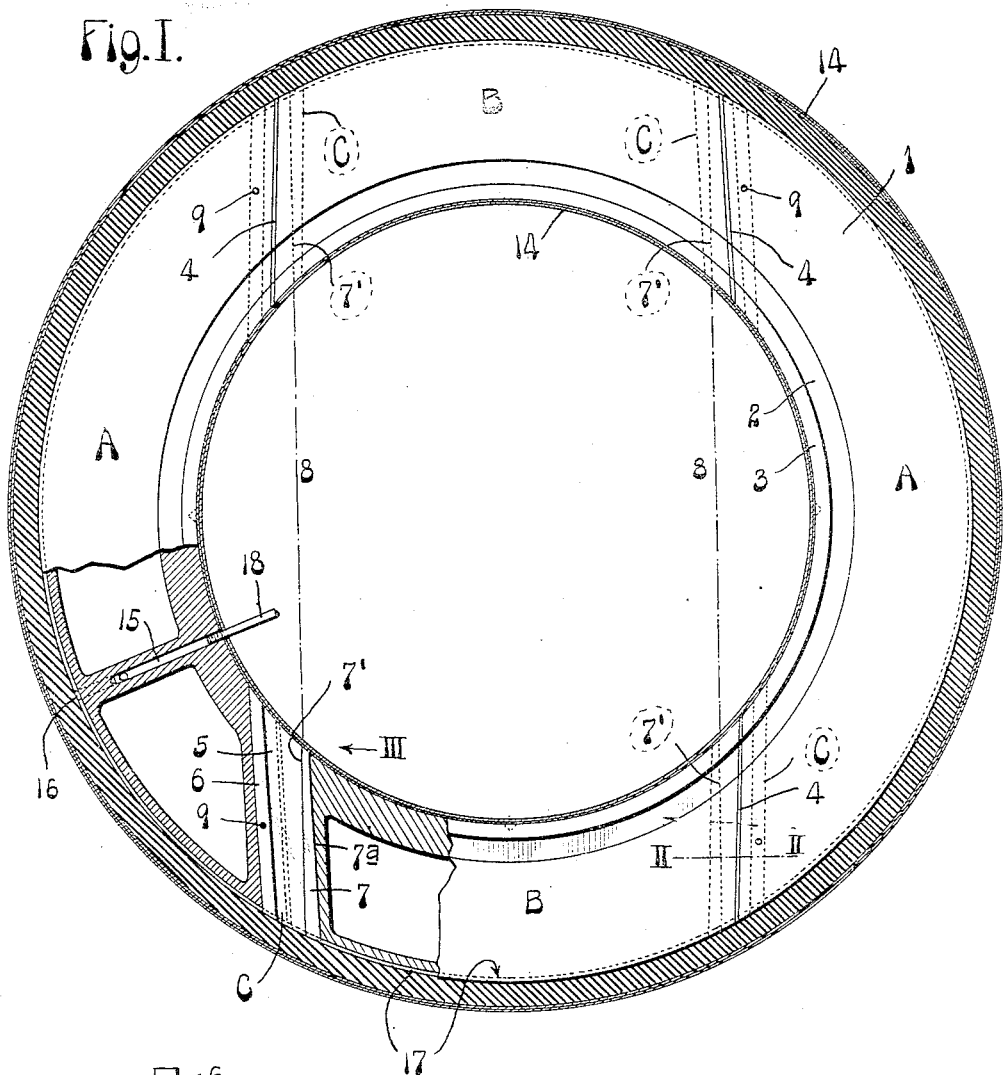

UNITED STATES PATENT OFFICE.

MARK A. DEES, OF ST. LOUIS, MISSOURI, ASSIGNOR OF ONE-HALF TO THE AMERICAN TIRE COMPANY, OF ST. LOUIS, MISSOURI, A CORPORATION OF MISSOURI, AND ONE-HALF TO THE B. F. GOODRICH COMPANY, OF NEW YORK, N. Y., A CORPORATION OF NEW YORK.

APPARATUS FOR FORMING PNEUMATIC TIRES.

1,117,803.

Specification of Letters Patent.

Patented Nov. 17, 1914.

Application filed November 24, 1913. Serial No. 802,676.

*To all whom it may concern:*

Be it known that I, MARK A. DEES, a citizen of the United States of America, and a resident of the city of St. Louis and State of Missouri, have invented certain new and useful Improvements in Apparatus for Forming Pneumatic Tires, of which the following is a full, clear, and exact description, reference being had to the accompanying drawings, forming a part of this specification.

My invention relates to a tire forming apparatus, suitable for use in carrying out a method of making pneumatic tire casings in which the tire fabric is stretched before or during the vulcanization of the rubber.

In carrying out my invention, the tire structure is built up on an annular core, the rubberized fabric elements, except the innermost ply, being wrapped tightly onto said core. Fluid under pressure is then introduced between the core and the innermost fabric element for the purpose of stretching the fabric before the rubber in the raw tire structure is vulcanized. The core completely fills the raw tire structure and the fluid under pressure is forced between the tire and the core, the latter being provided with a duct through which the fluid passes. Prior to this invention raw tires have been completely filled with fluid under pressure for the purpose of stretching the fabric, but, according to my improvement, the raw tire is initially filled by the core, and to produce the stretching action, it is only necessary to introduce a small quantity of fluid between the core and the tire. Two important advantages are gained by this feature, namely, the stretching action begins immediately upon the introduction of the fluid under pressure and all of the fluid entering between the core and tire is utilized in stretching the fabric. In using the old apparatus to which I have referred it is necessary to fill the tire with water or other fluid before the fabric begins to stretch. The second important advantage is that a small quantity of water may be forced between the core and the tire to produce the desired stretching action and during the vulcanization all, or almost all, of the water will be converted into steam. This is very desirable because the tire structure may be injured by the presence of water in the tire during the vulcanization process. The annular core is preferably provided with an angular duct leading from its inner circle or inner edge to the lowermost point on the lower side face of the core, and at the surface of said core is preferably an annular peripheral groove and a transverse groove leading from said peripheral groove to the lower end of said angular duct. The object in forming these grooves and the angular duct is to provide a drain through which water may be forced from the tire by the pressure of steam within the tire; at the same time providing passageways through which the fluid under pressure may be primarily conducted to the periphery of the annular core or mandrel to begin the stretching action at the transverse middle portion of the fabric opposite the tread of the tire; gradually forcing the tire from the sides of the core, and equalizing the stretching action at the sides of the tire structure, as will be more fully described.

Another object of the invention is to produce a collapsible core or mandrel comprising sections firmly interlocked with each other and adapted to be separated to permit the removal of the core from the tire.

Figure I is a horizontal section of a tire forming apparatus embodying the features of my invention, a portion of the core being shown in elevation. Fig. II is a section taken approximately on line II—II, Fig. I. Fig. III is a detail view of one of the keys utilized in connecting the core sections, looking in the direction indicated by the arrow III, Fig. I. Fig. IV is an enlarged transverse section of the apparatus shown in Fig. I. Fig. V is a view similar to Fig. IV, illustrating a modification.

In the accompanying drawings: A designates main core sections and B designates intermediate core sections arranged between the ends of the main core sections. These sections are united to produce an annular core having a head 1, a neck 2, and flanges 3 at the inner circle of the core. In making the sectional core, a ring of the required cross section is cut into four parts, as seen in Fig. I, the cuts being made at tangents to the axis of the core and to compensate for the material removed, shims or filler plates 4 are interposed between the ends of the sections. The sectional structure is therefore produced in the form of a true circle.

Substantially T-shaped grooves are formed in the ends of each core section and the sections of the core are united by keys C seated in said grooves. Each key C consists of a web 5 and flanges 6 and 7 at the ends of said web, the key being preferably of substantially I-shape in cross section. Each key C is tapered, or of wedge form as seen in Fig. III, the smallest end being innermost in the core, and its flanges 7 are tapered to firmly hold the adjacent core section and to permit the ready removal of said core section. All of the keys C have faces 7' which are parallel with each other, when the core sections are assembled as indicated by dotted lines 8, Fig. I. The key faces 7$^a$ may be parallel with the end faces of the core sections, but these faces are inclined with respect to the parallel faces 7', so that the sections B may be tightly wedged onto the keys. 9 are pins securing the keys to the sections A.

In removing the core sections the tread of the tire is struck at a point opposite one of the intermediate core sections B to loosen said section from the wedge like keys. The core section B is moved along the parallel faces 7' of the keys, in the direction indicated by the dotted lines 8, Fig. I, and it will be noted that at the beginning of such movement the core is disengaged from the other faces of the keys C, and thereafter permitted to slide freely along the parallel faces 7'. Another important feature is that the sliding movement of one of the intermediate sections B along the wedge like keys does not impart any movement to the other core sections. This is important, because three of the sections are rigidly connected together when the first section B is removed, and breakage would occur if said sections were rocked or sprung to any degree, by the movement of the fourth section along the wedges C. The different core sections may be hollow to lighten the structure, but their ends are preferably closed to prevent fluid from passing into the sections, and the ends of the keys C are preferably finished to conform to the shape of the inner and outer faces of the core. In building up a tire, layers of fabric 10 are placed on the periphery of the core, and firmly fitted to the sides of said core, the fabric in the inner layer being preferably unstretched, or substantially so, and the fabric in the outer layers being stretched. The usual beads 11 may be formed at the inner edges of fabric in any suitable manner, and presser rings 12 may then be applied to the opposite sides of the tire. Raw rubber 13 is applied to the outer face of the fabric, and the structure so produced is covered by a fabric wrapping 14, as seen in Fig. IV. The fabric is thus firmly pressed onto the core, and a tight joint is produced at the separable edges of the tire to prevent the escape of fluid from the interior of the tire.

Before the tire is vulcanized, or at the beginning of the vulcanizing process, fluid is introduced between the core and fabric to place the fabric threads under a degree of tension, except the fabric in the inner layer, for the purpose of taking up any slack in the fabric, in the outer layers, and to adjust the threads so that such fabric will withstand the usual inner tube pressure without yielding to any appreciable extent. The fluid is introduced through an angular duct 15 leading from the inner circle of the core to the lowermost point on the bottom face of the core, (Fig. IV). A transverse groove 16 leads from the lower end of the duct 15 to an annular groove 17 formed in the periphery of the core. The fluid under pressure passes from the duct 15, through the transverse groove 16 to the annular peripheral groove 17, and the stretching of the fabric begins at the center of the periphery of the core. As the fluid continues to flow into the tire, the fabric is gradually peeled from the sides of the core and the stretching action continues along the sides of the tire. I deem it an advantage to begin the stretching at the middle of the fabric, as just described, for the reason that pressure is then equally distributed to the opposite sides of the tire, both sides being subjected to the same degree of tension.

While it is important to begin the stretching at the middle of the structure, I preferably form the inlet duct 15 as shown in Fig. IV, so that it terminates at the lower face of the core, the object being to utilize this inlet duct as a drain duct in removing water from the interior of the tire.

The fluid introduced into the tire is preferably water, and, as before stated, only a small quantity of water is required to force the fabric away from the core. During the vulcanizing operation, the tire is heated and almost all of the water is turned into steam; however, a small quantity of water may remain in the lower portion of the tire and this water must be removed to secure the best results in curing the tire. A pipe 18, communicating with the duct 15, (Fig. I), provides for the delivery of fluid to the tire, and, the drainage of water from the lower portion of the tire, through the duct 15 into the pipe 18.

Fig. V illustrates a modification in which a core constructed as shown in Figs. I to IV is fitted to a pair of outer mold sections 20. In this modified structure, the tire is built up on the core, as previously described, and the fluid under pressure is forced through the duct to expand the tire structure, forcing it away from the core and into engagement with the mold sections, as seen in Fig. V.

I claim:—

1. A tire forming apparatus comprising an annular core upon which a tire structure having separable edges may be tightly wrapped and afterward stretched therefrom by the introduction of fluid between the annular core and the tire, said annular core having an outlet duct leading from its inner portion to its bottom face for the purpose of draining liquid from the bottom of the tire in response to fluid pressure in the tire, and means for preventing the escape of fluid under pressure at the separable edges of the tire.

2. A pneumatic tire forming apparatus comprising a core upon which the raw tire structure may be built, said core having a peripheral passageway for the circulation of fluid between the periphery of the core and the inner face of the tire opposite its tread, so as to permit the fluid to circulate around the core at a point substantially opposite the tread of the tire thereby primarily stretching the middle portion of the tire and thereafter gradually stretching the sides of the tire, and the said core being provided with a passageway leading to said peripheral passageway.

3. A pneumatic tire forming apparatus comprising a core upon which the raw tire structure may be built, said core having a peripheral passageway for the circulation of fluid between the periphery of the core and the inner face of the tire opposite its tread, the said core being provided with a duct leading from the inner portion of the core to the bottom face thereof and communicating with the said peripheral passageway.

4. A pneumatic tire forming apparatus comprising a core upon which the raw tire structure may be built, said core having a peripheral passageway for the circulation of fluid between the periphery of the core and the inner face of the tire opposite its tread, the said core being provided with a duct leading from the inner portion of the core to the bottom face thereof and a transverse channel leading from said duct to the said peripheral passageway.

5. A pneumatic tire forming apparatus comprising a core upon which the raw tire structure may be built, said core having an annular passageway formed around its periphery for the circulation of fluid between the periphery of the core and the inner face of the tire, the said core also having a passageway for conducting fluid to said annular passageway.

6. A pneumatic tire forming apparatus comprising a core upon which the raw tire structure may be built to be afterward stretched therefrom by the introduction of fluid between the core and tire, said core having an outlet duct leading from its inner portion to its bottom face for the purpose of draining fluid from the lower portion of the tire.

7. A core or mandrel of the character described comprising segmental sections and wedges uniting the ends of said sections, said wedges having substantially parallel faces extending tangentially of the core, and one of the core sections being provided with substantially parallel faces adapted to slide along said tangential faces of the wedges when the last named core section is moved toward the center of the core.

8. A core or mandrel of the character described comprising segmental sections and tapered wedges uniting said sections, said wedges having substantially parallel faces and the ends of one of the segmental sections being provided with corresponding faces so that the said section may be moved along the wedges toward the center of the core without imparting movement to any of the other sections.

MARK A. DEES.

In the presence of—
A. J. McCauley,
E. B. Linn.